United States Patent
Patino (10) Patent No.: US 9,048,679 B2
(45) Date of Patent: Jun. 2, 2015

(54) MAXIMIZED BATTERY CAPACITY CHARGE BASED ON EQUILIBRIUM CHARGING

(75) Inventor: Joseph Patino, Miramar, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 376 days.

(21) Appl. No.: 13/535,921

(22) Filed: Jun. 28, 2012

(65) Prior Publication Data

US 2014/0002007 A1 Jan. 2, 2014

(51) Int. Cl.
*H02J 7/00* (2006.01)

(52) U.S. Cl.
CPC ................... *H02J 7/0086* (2013.01)

(58) Field of Classification Search
CPC ........ Y02J 70/40; Y02B 40/90; H02J 7/1469; H02J 7/00; H02J 7/0068; H02J 7/0075; H02J 7/0086; Y02T 10/7005; H01M 10/44
USPC .................. 320/107, 132, 157, 162
See application file for complete search history.

(56) References Cited

U.S. PATENT DOCUMENTS

| | | |
|---|---|---|
| 5,442,274 A | 8/1995 | Tamai |
| 5,773,959 A | 6/1998 | Merritt et al. |
| 5,808,442 A | 9/1998 | Kaite et al. |
| 6,121,751 A | 9/2000 | Merritt |
| 6,583,605 B2 | 6/2003 | Yagi et al. |
| 7,504,803 B2 | 3/2009 | Cho |
| 7,911,185 B2 | 3/2011 | Yonezawa |
| 2002/0105305 A1 | 8/2002 | Yagi et al. |
| 2009/0243553 A1* | 10/2009 | Walley et al. ............. 320/162 |
| 2010/0033137 A1 | 2/2010 | Guang et al. |
| 2010/0066311 A1 | 3/2010 | Bao et al. |
| 2010/0090662 A1 | 4/2010 | Okuto |
| 2010/0188051 A1 | 7/2010 | Yamazaki et al. |
| 2010/0237831 A1* | 9/2010 | Osswald et al. ............. 320/134 |

FOREIGN PATENT DOCUMENTS

| | | |
|---|---|---|
| DE | 4203854 | 9/1992 |
| EP | 0565303 | 10/1993 |
| EP | 1571747 | 9/2005 |
| EP | 2207236 | 7/2010 |
| EP | 2381557 | 10/2011 |
| WO | WO2007/069196 | 6/2007 |

OTHER PUBLICATIONS

European Search Report, EP12174238.1, Jan. 23, 2013.

* cited by examiner

*Primary Examiner* — Vuthe Siek
(74) *Attorney, Agent, or Firm* — Fleit Gibbons Gutman Bongini & Bianco P.L.

(57) ABSTRACT

The present disclosure provides for repeatedly charging a rechargeable battery during a single charging session to a steady state voltage to attain a higher charge capacity of the rechargeable battery than a charge capacity of the rechargeable battery existing prior to the rechargeable battery being charged to the steady state voltage. The higher charge capacity is attained without exceeding a maximum allowable charge threshold of the rechargeable battery.

22 Claims, 5 Drawing Sheets

MAXIMIZED BATTERY CAPACITY CHARGE BASED ON EQUILIBRIUM CHARGING

TECHNICAL FIELD

The present disclosure relates to a method for charging rechargeable batteries and a device therefore.

BACKGROUND

Rechargeable batteries, sometimes referred to as rechargeable battery packs or battery packs, are used to power a great variety of devices, including portable devices such as mobile phones, cellular phones, smart phones, personal digital assistants (PDAs), digital cameras, wireless organizers, wirelessly enabled notebook computers, tablet computing devices, handheld electronic gaming devices, digital photograph albums, which may or may not be wireless.

As the complexity of and demand for applications run by such devices continues to grow, the power consumption demands made by devices on their rechargeable batteries continues to grow as well. There is a need to not only provide a stable rechargeable battery power source but also a rechargeable battery that has a large charge capacity that can support ever longer operating and standby times for the device being powered.

BRIEF DESCRIPTION OF THE DRAWINGS

Example embodiments of the present disclosure will be described below with reference to the included drawings such that like reference numerals refer to like elements and in which.

DETAILED DESCRIPTION

An undesirable occurrence after removing a charge current or a discharge current from a rechargeable battery is referred to as voltage creep, a condition which may occur when a positive charge current is removed from a rechargeable battery, in which the battery voltage creeps down until it finally stabilizes. Similarly, when a negative discharge current is removed from a rechargeable battery, the battery voltage creeps up until finally stabilized. In order to counter the occurrence of such voltage creep following the termination of a charge current to a rechargeable battery and to further maximize the charge capacity achievable upon charging the rechargeable battery, repeated recharging of the rechargeable battery during a single charging session until a stop charge condition is satisfied and without violating any charge voltage or current cut-off thresholds allows higher charge capacity and steady state voltage characteristics of the rechargeable battery to be achieved. Repeated recharging of the rechargeable battery during a single charging session is conducted upon a resume charge condition of the rechargeable battery being satisfied and until a stop charge condition is satisfied.

Whereas a previous approach to battery recharging inherently leads to voltage creep once the charge current is removed upon reaching the desired voltage, the illustrative examples given herein charge the rechargeable battery to a steady state, a stop charge condition, which does not violate a maximum allowable threshold voltage, without this voltage creep and thus maximizes the charge capacity into the rechargeable battery.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein. Therefore, in accordance with an aspect of the present disclosure, there is provided a method of charging a rechargeable battery: supplying a charge current to the rechargeable battery until a battery voltage of the rechargeable battery is equal to or greater than a first voltage threshold; pausing supplying the charge current; determining that a resume charge condition is satisfied; resuming supplying the charge current to the rechargeable battery; and repeating, during a single charging session, the pausing, determining and resuming, until a stop charge condition is satisfied.

In accordance with another aspect of the present disclosure, there is provided a device for charging a rechargeable battery, including: a voltage detector that detects a voltage across terminals of the rechargeable battery; a switching device that controls application or interruption of a charge current to the rechargeable battery; a charging controller coupled to the switching device and to the voltage detector that controls the switching device such that: the charging controller controls the switching device to supply a charge current to the rechargeable battery until a battery voltage of the rechargeable battery is equal to or greater than a first voltage threshold; the charging controller controls the switching device to pause supplying the charge current; in response to determining that a resume charge condition is satisfied, the charging controller controls the switching device to resume supplying the charge current to the rechargeable battery; and repeating, during a single charging session, the pausing, determining and resuming, until a stop charge condition is satisfied.

In accordance with still further aspects of the present disclosure, there is provided a non-transitory computer-readable medium having computer-executable instructions for charging a rechargeable battery: supplying a charge current to the rechargeable battery until a battery voltage of the rechargeable battery is equal to or greater than a first voltage threshold; pausing supplying the charge current; determining that a resume charge condition is satisfied; resuming supplying the charge current to the rechargeable battery; and repeating, during a single charging session, the pausing, determining and resuming, until a stop charge condition is satisfied.

As mentioned, an undesirable occurrence after removing a charge current or a discharge current from a rechargeable battery is voltage creep, which may occur when a positive charge current is removed from a rechargeable battery, when the battery voltage creeps down until it finally stabilizes. Similarly, when a negative discharge current is removed from a rechargeable battery, the battery voltage creeps up until finally stabilized. This phenomenon of voltage creep can be understood by referring to the battery model of FIG. 1, in which the rechargeable battery behaves as two parallel capacitors connected together with a large resistor R2 and a small resistor R1. As the battery is charged, the first capacitor C1 charges to a higher voltage than C2 through the smaller resistor R1. As such, when the charge current is removed, C1 tries to reach equilibrium with C2 and the voltage on the rechargeable battery, which may also be referred to as a battery pack, decreases. Conversely, as the battery is discharged, the first capacitor C1 discharges to a lower voltage than C2 through the smaller resistor R1. When the discharge current is removed, C1 then tries to reach equilibrium with C2 and the voltage on the battery pack increases. This modeled battery functionality may be relied upon to maximize the charge capacity into the rechargeable battery.

Figure 1:
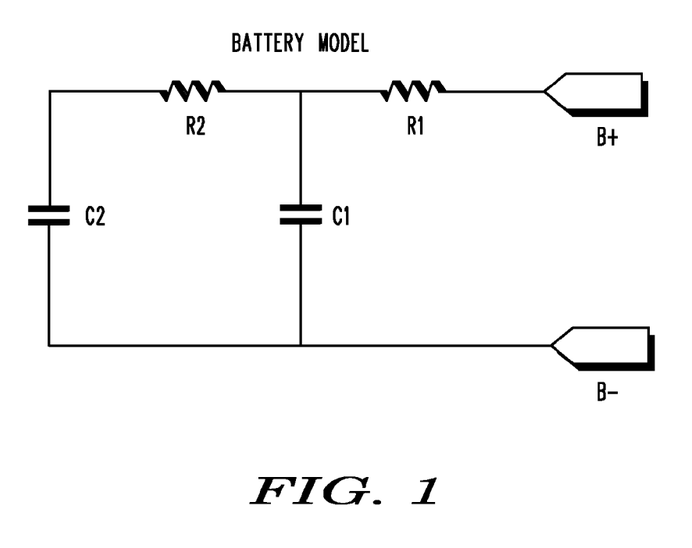
FIG. 1 is a block diagram of a rechargeable battery model, in accordance with various aspects of the present disclosure.

In a previous approach to charging a rechargeable battery, the battery is charged to an optimum or desired voltage and the charge current then terminated once the charge current has tapered to an optimum current cut-off threshold. In an illustrative example given herein, the optimum desired voltage of a rechargeable battery may be 4.2 V and the optimum current cut-off threshold of the rechargeable battery 50 mA. When the charge current terminates, capacitor C1, in this example, may be charged to approximately 4.2 volts, but when the charge current is removed, the battery voltage creeps down to approximately 4.1 steady state because C1 is discharged by about 0.1 V to reach equilibrium with C2.

Whereas this previous approach inherently leads to voltage creep once the charge current is removed upon reaching the desired voltage, the illustrative examples given herein charge the rechargeable battery to a steady state, which does not violate a maximum allowable threshold voltage or the optimum current cutoff threshold, without this voltage creep and thus maximizes the charge capacity into the rechargeable battery.

Continuing with the battery model illustrated in FIG. 1, in accordance with various aspects of the disclosure the C2 capacitor is charged to the same desired or optimum voltage threshold as C1. This is achieved by repeatedly charging C1 to a desired steady state voltage during a single charging session to also allow C2 to reach the same desired steady state voltage, such that when the charge sequence is truly terminated, the battery voltage of both C1 and C2 is at a steady state of 4.2 V, for example, instead of creeping back down to 4.1V. The repeated charging of the rechargeable battery during a single charging session occurs until a stop charge condition, such as the battery voltage reaching the steady state voltage that is greater than or equal to an equilibrium voltage threshold or upon repeatedly charging the battery a predetermined number of times or iterations. The single charging session may be defined by when a charging cable or accessory is physically connected to the rechargeable battery to when the charging cable or accessory is physically removed.

If the battery pack is characterized as having a roughly 150 mOhm impedance, at a 50 mA current cut-off, for example, the drop across the rechargeable battery is approximately 7.5 mV. So, in this sense, the battery will never truly reach 4.2V but the steady state voltage to which the rechargeable battery is charged upon the resume charge condition being satisfied is characterized by a voltage drop that is substantially determined by an impedance of the rechargeable battery; in this case, a steady state voltage of 4.2V less 7.5 mV. Both C1 and C2 are at this steady state voltage and the battery has been charged to reach full potential capacity, the higher charge capacity, without either C1 or C2 exceeding their optimal charge voltage or current cut-off thresholds. In this way, the higher charge capacity of the rechargeable battery is attained at a steady state voltage that does not exceed a maximum allowable charge threshold of the rechargeable battery, i.e. without exceeding the maximum allowable charge voltage or current cut-off thresholds of the rechargeable battery.

Figure 2:
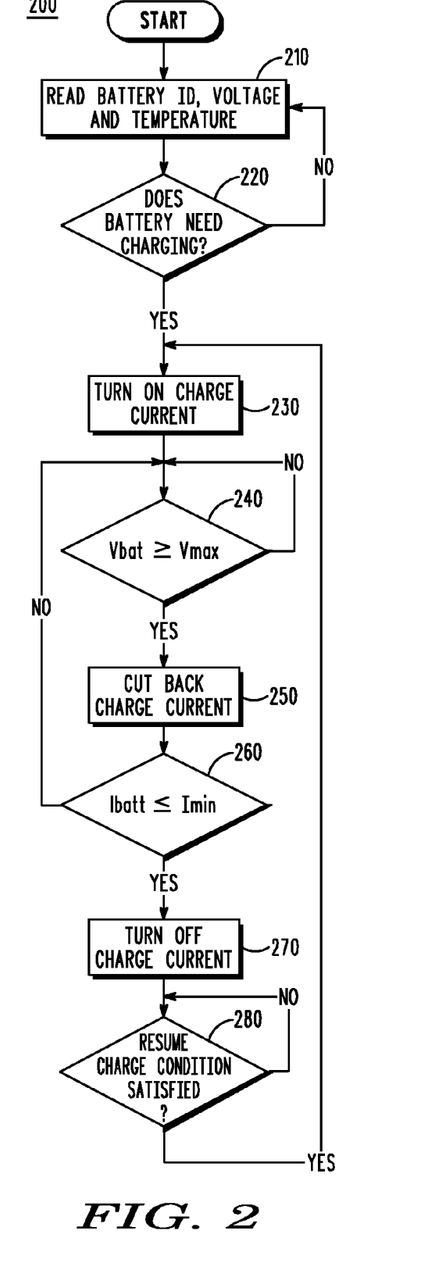
FIGS. 2, 3, and 4 illustrate flows for charging a rechargeable battery, in accordance with various aspects of the present disclosure.

Referring now to FIG. 2, a flow 200 for charging a rechargeable battery during a single charging session is shown. In this flow, it can be seen that upon a resume charge condition of the rechargeable battery being satisfied, such as by pausing supplying the charge current for a predetermined period of time or a drop in the battery voltage meeting or exceeding a voltage drop threshold, a charge current is supplied to the rechargeable battery to charge the rechargeable battery to a steady state voltage and attain a higher charge capacity of the rechargeable battery than a charge capacity of the rechargeable battery that existed prior to the rechargeable battery being charged to the steady state voltage. As noted before, the achieved steady state voltage does not exceed a maximum allowable threshold voltage for the rechargeable battery.

At Block 210, information about the rechargeable battery is collected, such as the battery voltage; battery identification (ID) and temperature may also be read. At Decision Block 220 this information is used to determine whether the battery needs to be charged. If no, the flow returns to Block 210. If yes, then at Block 230, charge current is provided to the rechargeable battery. This occurs until the battery voltage is substantially equal to or greater than a voltage threshold, as determined at Decision Block 240. If the battery voltage is substantially equal to or greater than a voltage threshold, then the charge current is tapered and a reduced charge current is supplied to the rechargeable battery at Block 250. The charge current may be tapered until a battery current of the rechargeable battery is substantially less than or equal to a current cut-off threshold, as determined at Decision Block 260, at which point the reduced charge current is no longer supplied to the rechargeable battery at Block 270.

As shown at Decision Block 280, the next inquiry is whether a resume charge condition has been satisfied, indicating that the charge current may again be supplied to the rechargeable battery. If yes, then the flow returns to Block 230. Upon resuming supplying the charge current, the charge current may be tapered until the battery voltage is equal to or greater than a voltage threshold. It is noted that the resume charge condition is not related to the depletion of the rechargeable battery, another condition that would prompt renewed recharging. Rather, the resume charge condition is the occurrence of some condition, such as time or voltage droop, for example, that will trigger repeated charging of the rechargeable battery during a single charging session until a stop charge condition is satisfied to attain the steady state voltage, with no voltage drop, and the maximum charge capacity of the battery. The higher charge capacity of the rechargeable battery is attained without exceeding the optimal or maximum allowable charge thresholds of the battery. Not exceeding the optimal or maximum allowable charge thresholds is an important consideration, as exceeding the battery charge voltage or current cut-off thresholds may damage the battery and/or void warranties of the battery. As discussed, the recharging of the rechargeable battery during a single charging session occurs until a stop charge condition, such as performing the operations shown in FIG. 2 a predetermined number of times or upon the battery voltage reaching a steady state voltage that is greater than or equal to an equilibrium voltage threshold.

Figure 3:
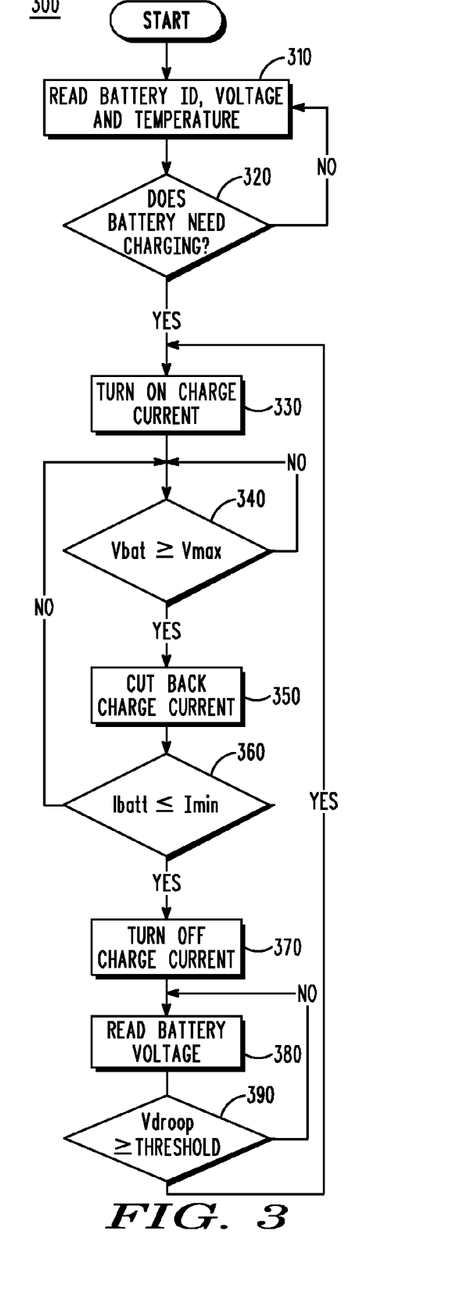

Referring now to FIG. 3, flow 300 illustrates recharging a rechargeable battery during a single charging session when the resume charge condition is a droop in the battery voltage that is substantially equal to or greater than a voltage drop threshold. At Block 310, information about the rechargeable battery is collected, such as the battery voltage; battery identification (ID) and temperature may also be read. This battery voltage information is used at Decision Block 320 to determine whether the battery needs to be charged. If yes, then the charge current is supplied to the rechargeable battery at Block 330. The charge current is supplied to the rechargeable battery until a battery voltage of the battery is substantially equal to or greater than a voltage threshold, as determined at Decision Block 340, at which point the charge current is cut back or reduced, and the charge current that is supplied to the rechargeable battery may be tapered until the battery voltage is equal to or greater than the voltage threshold at Block 350. When it is determined at Decision Block 360 that a battery current of the rechargeable battery is substantially less than or equal to a current cut-off threshold, then no charge current is supplied to the rechargeable battery, at Block 370.

Recharging of the rechargeable battery does not commence until the occurrence of a resume charge condition. In this example, the resume charge condition is satisfied by a droop in the battery voltage of the rechargeable battery substantially meeting or exceeding a voltage threshold. Thus, the battery voltage is measured at Block 380. When a drop in the battery voltage of the rechargeable battery is substantially equal to or greater than a voltage drop threshold, as determined at Decision Block 390, the resume charge condition in this example is satisfied and the battery is again charged at Block 330. Upon resuming supplying the charge current, the charge current may be tapered until the battery voltage is equal to or greater than a voltage threshold. As discussed, the recharging of the rechargeable battery during a single charging session occurs until a stop charge condition, such as performing the operations shown in FIG. 3 a predetermined number of times or upon the battery voltage reaching a steady state voltage that is greater than or equal to an equilibrium voltage threshold.

Figure 4:
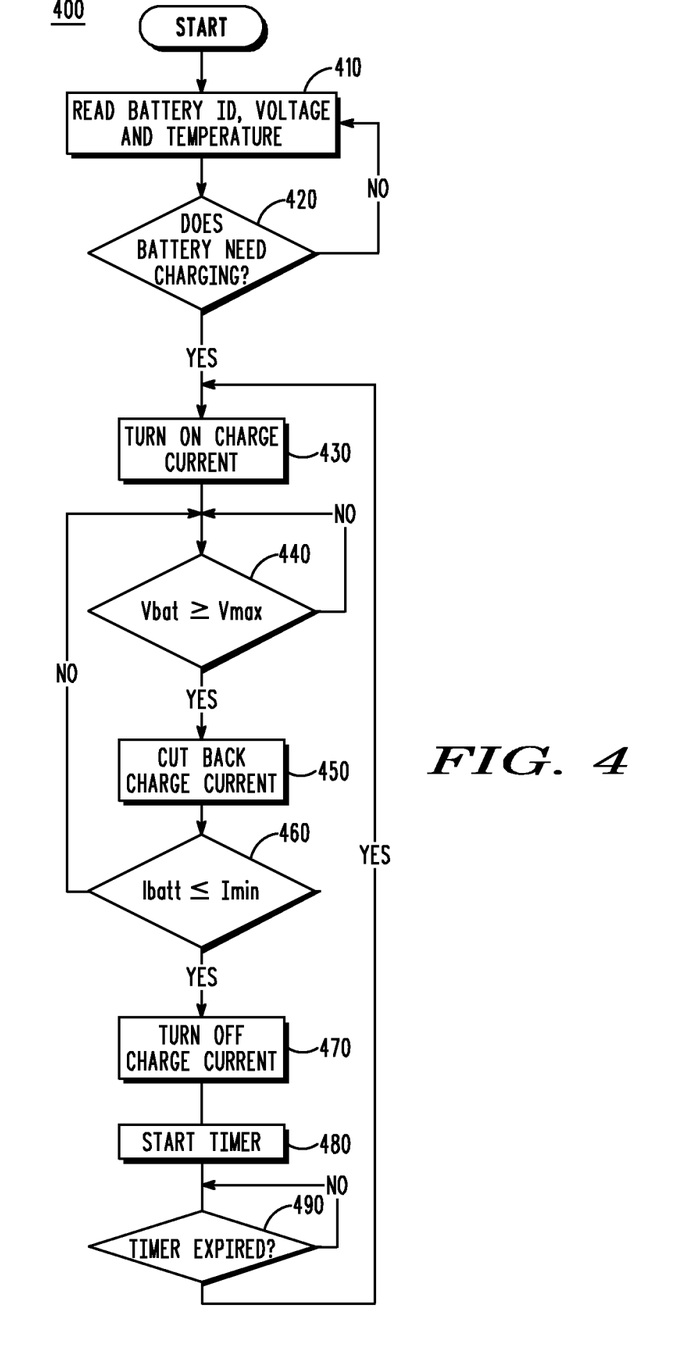

It is noted that the drop in the battery voltage occurs after a previous charging of the rechargeable battery and is not associated with depletion of the rechargeable battery. Repeated application of a charge current to the rechargeable battery upon a resume charge condition being satisfied allows a higher charge capacity of the rechargeable battery to be achieved without exceeding the maximum allowable charge threshold voltage of the rechargeable battery. Consider an exemplary overnight charging scenario in which a rechargeable battery may be charged for 8 hours during a single charging session. During this time, a normal charge sequence may terminate after the first approximately 2 ½ hours. In accordance with aspects presented herein, however, the occurrence of multiple resume charge conditions may allow the battery to be repeatedly charged for the remaining 5½ hours and in fact a charge equilibrium steady state condition of the rechargeable battery may be achieved within 2 to 4 hours after normal charging cycle is completed. This allows the rechargeable battery to achieve charge equilibrium and therefore maximum charge capacity without exceeding maximum allowable voltage. The number of times the rechargeable battery will be charged under the resume charge condition may vary and occurs when a resume charge condition is satisfied. The resume charge function is repeated, as indicated in FIG. 3, until the resume charge condition is no longer applicable or until the rechargeable battery is removed from its charger. Thus a rechargeable battery put on a charger overnight may be charged to substantially equilibrium without exceeding the maximum allowable charge threshold voltage of the rechargeable battery within 2 to 4 hours after the normal charging cycle is completed. Referring now to FIG. 4, flow 400 illustrates recharging a rechargeable battery when the resume charge condition is determined by the expiration of a timer. At Block 410, information about the rechargeable battery is collected, such as the battery voltage; battery identification (ID) and temperature may also be read. This battery voltage information is used at Decision Block 420 to determine whether the battery needs to be charged. If yes, then the charge current is supplied to the rechargeable battery at Block 430. The charge current is supplied to the rechargeable battery until a battery voltage of the battery is substantially equal to or greater than a voltage threshold, as determined at Decision Block 440, at which point the charge current is cut back or reduced, and a tapered or reduced charge current is then supplied to the rechargeable battery at Block 450. When it is determined at Decision Block 460 that a battery current of the rechargeable battery is substantially less than or equal to a current cut-off threshold, then no charge current is supplied to the rechargeable battery, at Block 470.

Upon the charge current no longer being supplied to the rechargeable battery, a timer is started at Block 480 and the resume charge condition is satisfied when the timer has expired, as determined at Decision Block 490. Thus, when it is determined that a timer initiated after a previous charging of the rechargeable battery reaches a predetermined time, the resume charge condition is satisfied and recharging of the rechargeable battery resume at Block 430. Upon resuming supplying the charge current, the charge current may be tapered until the battery voltage is equal to or greater than a voltage threshold. Again, as noted above, the resume charge function allows a higher charge capacity of the rechargeable battery to be achieved than would otherwise be achieved with a normal charging protocol without exceeding the maximum allowable charge threshold voltage of the rechargeable battery. As before, the recharging of the rechargeable battery during a single charging session occurs until a stop charge condition, such as performing the operations shown in FIG. 4 a predetermined number of times or upon the battery voltage reaching a steady state voltage that is greater than or equal to an equilibrium voltage threshold.

Figure 5:
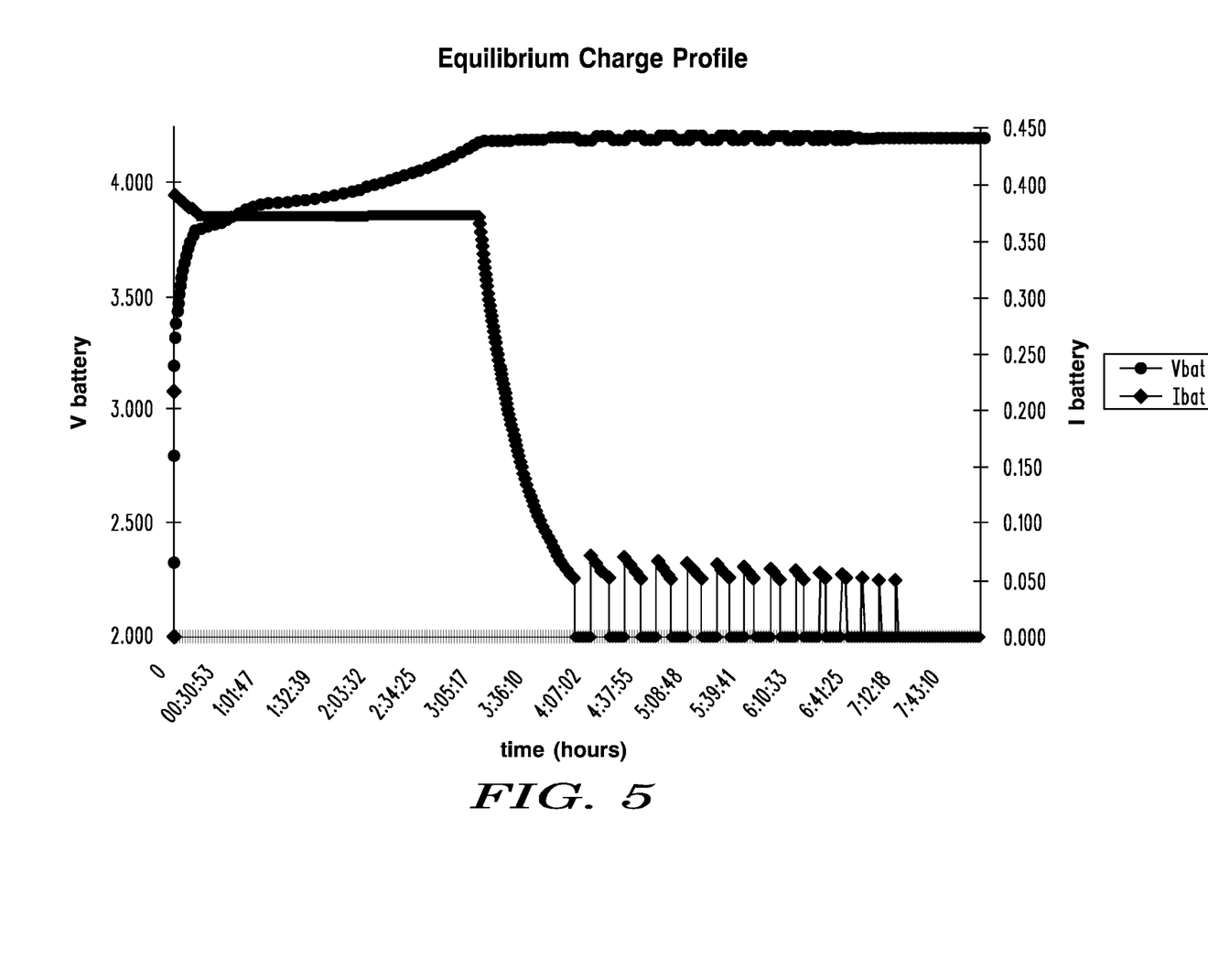
FIG. 5 is a graph that illustrates charging of a rechargeable battery, in accordance with various aspects of the present disclosure.

Referring now to the graph of FIG. 5, an equilibrium charge profile of a rechargeable battery, in which battery voltage Vbat and charge current Ibat are illustrated over time as the rechargeable battery is being charged. Over time, it can be seen that with repeated recharging of the battery during a single charging session a true steady state voltage is achieved, without the voltage creeping associated with other charging schemes. It can be seen that repeated application of the charge current to the battery is not associated with any depletion of the battery; indeed, Vbat only increases over time with this charging approach. After some period of time, it can be seen that the optimal maximized steady state voltage of the battery is achieved and that further charging doesn't produce as significant increases in Vbat and charge capacity as was attained with earlier recharging. Thus, most benefit can be expected to occur within the first four hours, in this example.

Figure 6:
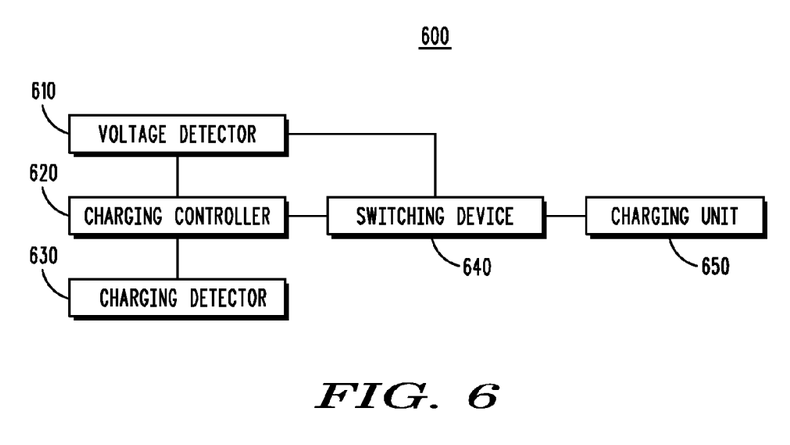
FIG. 6 is a block diagram of a charging device, in accordance with various aspects of the present disclosure.

A device capable of the charging methodologies outlined above is illustrated in block diagram 600 of FIG. 6. Such a charging device, sometimes referred to as a "charger," may include a voltage detector 610, a charging controller 620, a charging detector 630, switching device 640, and charging unit 650. The voltage detector 620 detects the voltage Vbat of the rechargeable battery. Charging detector 630 detects when the battery current of the rechargeable battery is substantially less than or equal to a current cut-off threshold, at which point charge current is not supplied to the rechargeable battery, as noted by Blocks 260, 360, and 460, respectively, of FIGS. 2, 3, and 4. This is the condition that occurs before satisfaction of a resume charge condition triggers continued re-charging of the rechargeable battery, as noted in Blocks 280, 380, 390, 480, and 490, respectively, of FIGS. 2, 3, and 4.

It can be seen that charging controller 620 is coupled to voltage detector 610, switching device 640, and charging detector 630. Charging controller 620 receives information from voltage detector 610 and charging detector 630 and controls switching device 640 to control charging of a rechargeable battery by charging until 650.

As earlier taught, satisfying a resume charge condition allows charging of a rechargeable battery to resume and a higher charge capacity and steady state voltage of the rechargeable battery to be realized. Thus, charging controller 620 controls the switching device 640 so that upon a resume charge condition of the rechargeable battery being satisfied, a charge current is supplied to the rechargeable battery to charge the rechargeable battery to a steady state voltage and attain a higher charge capacity of the rechargeable battery than a charge capacity of the rechargeable battery existing prior to the rechargeable battery being charged to the steady state voltage, wherein a maximum allowable charge threshold of the rechargeable battery is not exceeded in charging the rechargeable battery to attain the higher charge capacity.

In accordance with a representative example, after a previous charging of the rechargeable battery to the charge capacity, the charging controller repeats the following as needed to charge the rechargeable battery to the steady state voltage and to attain the higher charge capacity of the rechargeable battery without exceeding the maximum allowable charge threshold of the rechargeable battery:

the charging controller 620 controls the switching device 640 to supply the charge current to the rechargeable battery until a battery voltage of the battery is substantially equal to or greater than a voltage threshold;

when the battery voltage is substantially equal to or greater than the voltage threshold, the charging controller 620 controls the switching device 640 to reduce the charge current and supply a reduced charge current to the rechargeable battery;

when a battery current of the rechargeable battery is substantially less than or equal to a current cut-off threshold, the charging controller 620 controls the switching device 640 to not supply the reduced charge current to the rechargeable battery; and upon the resume charge condition being satisfied, the charging controller 620 controls the switching device 640 to resume supply of the charge current to the rechargeable battery to achieve a higher capacity of the rechargeable battery without exceeding the maximum voltage.

The charging device 600 may further include a timer coupled to the charging controller, so that upon the timer reaching a predetermined time after the charging controller controls the switching device to not supply the reduced charge current to the rechargeable battery, the resume charge condition is satisfied and the charging controller controls the switching device to resume supplying the charge current to the rechargeable battery.

Moreover, as previously discussed, the resume charge condition may be satisfied by a drop in the battery voltage. Thus, upon the voltage detector 610 detecting, after the charging controller controls the switching device to not supply the reduced charge current to the rechargeable battery, a drop in the battery voltage of the rechargeable battery being substantially equal to or greater than a voltage drop threshold, the resume charge condition is satisfied. The charging controller 620 controls the switching device 640 to resume supplying the charge current to the rechargeable battery. It is noted that the drop in the battery voltage is not associated with depletion of the rechargeable battery, as illustrated in FIG. 5. It is understood that a device for recharging a rechargeable battery may run software or an application capable of executing instructions stored on a computer-readable medium, as defined further below, for charging a rechargeable battery.

Experimental results verify the effectiveness of the rechargeable battery charging methodologies presented herein. Experiments were conducted on a C-S2 Lithium Ion (Li-Ion) cellphone battery characterized as having a 1000 mAh battery capacity and on an F—Si Li-Ion cellphone battery characterized as having a 1270 mAh battery capacity. The results of the tests for both the F-S1 battery and the C-S2 battery are shown below in Tables 1 and 2. For the F-S1 battery test, it can be seen that an extra charge capacity of 14 mA hours (mAh) or 1% was attained. This represents an increase in standby charge of approximately 7 hours! Likewise, in the C-S2 battery test, it can be seen that an increase in charge capacity of the rechargeable battery of 16 MAh or 1.4% was realized.

TABLE 1

SUMMARY OF RESULTS FOR F-S1 BATTERY

| Rec# | Cyc# | Step | TestTime | StepTime | Amp-hr | Watt-hr | Amps | Volts | State | ES | DPt | Time | ACImp/Oh | DCIR/Ohms |
|---|---|---|---|---|---|---|---|---|---|---|---|---|---|---|
| 1 | 0 | 1 | 0d00:00: | 0d00:00: | 0 | 0.00001 | 0.2625 | 3.16739 | D | 0 | Mar. 8, 2011 | 11:14 | 0 | 0 |
| 2 | 0 | 1 | 0d00:00: | 0d00:00: | 0.00332 | 0.01025 | 0.2602 | 3 | D | 133 | Mar. 8, 2011 | 11:15 | 0 | 0 |
| 3 | 0 | 3 | 0d00:00: | 0d00:00: | 0.00001 | 0.00002 | 1.0024 | 3.35889 | C | 0 | Mar. 8, 2011 | 11:15 | 0 | 0 |
| 4 | 0 | 3 | 0d03:17: | 0d03:16: | 1.27749 | 5.28867 | 0.01 | 4.19188 | C | 132 | Mar. 8, 2011 | 14:31 | 0 | 0 |
| 5 | 0 | 4 | 0d03:17: | 0d00:00: | 0 | 0.00001 | 0.2622 | 4.12673 | D | 0 | Mar. 8, 2011 | 14:31 | 0 | 0 |
| 6 | 0 | 4 | 0d08:10: | 0d04:52: | 1.26865 | 4.77728 | 0.2601 | 3 | D | 133 | Mar. 8, 2011 | 19:24 | 0 | 0 |
| 7 | 0 | 5 | 0d08:10: | 0d00:00: | 0.00001 | 0.00003 | 1.0012 | 3.35492 | C | 0 | Mar. 8, 2011 | 19:24 | 0 | 0 |
| 8 | 0 | 5 | 0d10:25: | 0d02:15: | 1.25592 | 5.18766 | 0.05 | 4.19982 | C | 132 | Mar. 8, 2011 | 21:40 | 0 | 0 |
| 9 | 0 | 6 | 0d10:25: | 0d00:00: | 0 | 0.00001 | 0.2623 | 4.1252 | D | 0 | Mar. 8, 2011 | 21:40 | 0 | 0 |
| 10 | 0 | 6 | 0d15:15: | 0d04:49: | 1.25352 | 4.71592 | 0.26 | 3 | D | 133 | Mar. 9, 2011 | 2:29 | 0 | 0 |
| 11 | 0 | 3 | 0d15:15: | 0d00:00: | 0.00001 | 0.00003 | 1.001 | 3.35828 | C | 0 | Mar. 9, 2011 | 2:29 | 0 | 0 |
| 12 | 0 | 3 | 0d18:28: | 0d03:13: | 1.26572 | 5.22604 | 0.01 | 4.19219 | C | 132 | Mar. 9, 2011 | 5:42 | 0 | 0 |
| 13 | 0 | 4 | 0d18:28: | 0d00:00: | 0 | 0.00001 | 0.2607 | 4.12673 | D | 0 | Mar. 9, 2011 | 5:42 | 0 | 0 |
| 14 | 0 | 4 | 0d23:19: | 0d04:51: | 1.26362 | 4.75683 | 0.26 | 3 | D | 133 | Mar. 9, 2011 | 10:34 | 0 | 0 |
| 15 | 0 | 5 | 0d23:19: | 0d00:00: | 0.00001 | 0.00003 | 1.0007 | 3.35645 | C | 0 | Mar. 9, 2011 | 10:34 | 0 | 0 |
| 16 | 0 | 5 | 1d01:33: | 0d02:14: | 1.25213 | 5.16904 | 0.05 | 4.20012 | C | 132 | Mar. 9, 2011 | 12:48 | 0 | 0 |
| 17 | 0 | 6 | 1d01:33: | 0d00:00: | 0 | 0.00001 | 0.2624 | 4.12642 | D | 0 | Mar. 9, 2011 | 12:48 | 0 | 0 |
| 18 | 0 | 6 | 1d06:22: | 0d04:48: | 1.25129 | 4.7119 | 0.2601 | 2.99985 | D | 133 | Mar. 9, 2011 | 17:37 | 0 | 0 |
| 19 | 0 | 3 | 1d06:22: | 0d00:00: | 0.00001 | 0.00002 | 1.0022 | 3.34745 | C | 0 | Mar. 9, 2011 | 17:37 | 0 | 0 |
| 20 | 0 | 3 | 1d09:34: | 0d03:11: | 1.26233 | 5.20858 | 0.01 | 4.19188 | C | 132 | Mar. 9, 2011 | 20:48 | 0 | 0 |

TABLE 1-continued

SUMMARY OF RESULTS FOR F-S1 BATTERY

| Rec# | Cyc# | Step | TestTime | StepTime | Amp-hr | Watt-hr | Amps | Volts | State | ES | DPt | Time | ACImp/Oh | DCIR/Ohms |
|---|---|---|---|---|---|---|---|---|---|---|---|---|---|---|
| 21 | 0 | 4 | 1d09:34: | 0d00:00: | 0 | 0.00001 | 0.2624 | 4.12581 | D | 0 | Mar. 9, 2011 | 20:48 | 0 | 0 |
| 22 | 0 | 4 | 1d14:25: | 0d04:50: | 1.26037 | 4.74473 | 0.2599 | 3 | D | 133 | Mar. 10, 2011 | 1:39 | 0 | 0 |
| 23 | 0 | 5 | 1d14:25: | 0d00:00: | 0.00001 | 0.00003 | 1.0005 | 3.36301 | C | 0 | Mar. 10, 2011 | 1:39 | 0 | 0 |
| 24 | 0 | 5 | 1d16:41: | 0d02:16: | 1.24707 | 5.15483 | 0.05 | 4.19997 | C | 132 | Mar. 10, 2011 | 3:56 | 0 | 0 |
| 25 | 0 | 6 | 1d16:41: | 0d00:00: | 0 | 0.00001 | 0.2622 | 4.12352 | D | 0 | Mar. 10, 2011 | 3:56 | 0 | 0 |
| 26 | 0 | 6 | 1d21:29: | 0d04:47: | 1.24636 | 4.68823 | 0.2601 | 3 | D | 133 | Mar. 10, 2011 | 8:43 | 0 | 0 |

|  | proposed | standard | delta capacity | delta % |
|---|---|---|---|---|
| Discharge cycle 1 | 1269 | 1254 | 15 | 1.2% |
| Discharge cycle 2 | 1264 | 1251 | 12 | 1.0% |
| Discharge cycle 3 | 1260 | 1246 | 14 | 1.1% |
|  | 1264 | 1250 |  |  |

|  | mAh | % |
|---|---|---|
| Avg increase | 14 | 1.1% |

TABLE 2

SUMMARY OF RESULTS FOR C-S2 BATTERY

| Rec# | Cyc# | Step | TestTime | StepTime | Amp-hr | Watt-hr | Amps | Volts | State | ES | DPt | Time | ACImp/Oh | DCIR/Ohms |
|---|---|---|---|---|---|---|---|---|---|---|---|---|---|---|
| 1 | 0 | 1 | 0d00:00: | 0d00:00: | 0 | 0.00001 | 0.2623 | 3.17563 | D | 0 | Mar. 8, 2011 | 11:14 | 0 | 0 |
| 2 | 0 | 1 | 0d00:00: | 0d00:00: | 0.00372 | 0.0115 | 0.26001 | 3 | D | 133 | Mar. 8, 2011 | 11:15 | 0 | 0 |
| 3 | 0 | 3 | 0d00:00: | 0d00:00: | 0.00001 | 0.00002 | 1.00153 | 3.28992 | C | 0 | Mar. 8, 2011 | 11:15 | 0 | 0 |
| 4 | 0 | 3 | 0d03:12: | 0d03:11: | 1.13713 | 4.69197 | 0.01 | 4.19188 | C | 132 | Mar. 8, 2011 | 14:26 | 0 | 0 |
| 5 | 0 | 4 | 0d03:12: | 0d00:00: | 0 | 0.00001 | 0.26078 | 4.13771 | D | 0 | Mar. 8, 2011 | 14:27 | 0 | 0 |
| 6 | 0 | 4 | 0d07:33: | 0d04:20: | 1.12945 | 4.25316 | 0.25994 | 3 | D | 133 | Mar. 8, 2011 | 18:47 | 0 | 0 |
| 7 | 0 | 5 | 0d07:33: | 0d00:00: | 0.00001 | 0.00002 | 1.00214 | 3.27161 | C | 0 | Mar. 8, 2011 | 18:47 | 0 | 0 |
| 8 | 0 | 5 | 0d09:41: | 0d02:08: | 1.11521 | 4.59502 | 0.05 | 4.20012 | C | 132 | Mar. 8, 2011 | 20:55 | 0 | 0 |
| 9 | 0 | 6 | 0d09:41: | 0d00:00: | 0 | 0.00001 | 0.26162 | 4.13863 | D | 0 | Mar. 8, 2011 | 20:55 | 0 | 0 |
| 10 | 0 | 6 | 0d13:58: | 0d04:16: | 1.11223 | 4.18456 | 0.26017 | 3 | D | 133 | Mar. 9, 2011 | 1:12 | 0 | 0 |
| 11 | 0 | 3 | 0d13:58: | 0d00:00: | 0.00001 | 0.00002 | 1.00191 | 3.27359 | C | 0 | Mar. 9, 2011 | 1:12 | 0 | 0 |
| 12 | 0 | 3 | 0d17:07: | 0d03:09: | 1.12794 | 4.64549 | 0.01 | 4.19203 | C | 132 | Mar. 9, 2011 | 4:21 | 0 | 0 |
| 13 | 0 | 4 | 0d17:07: | 0d00:00: | 0 | 0.00001 | 0.26062 | 4.13863 | D | 0 | Mar. 9, 2011 | 4:21 | 0 | 0 |
| 14 | 0 | 4 | 0d21:26: | 0d04:19: | 1.12497 | 4.23634 | 0.26009 | 3 | D | 133 | Mar. 9, 2011 | 8:41 | 0 | 0 |
| 15 | 0 | 5 | 0d21:26: | 0d00:00: | 0.00001 | 0.00002 | 1.00153 | 3.27298 | C | 0 | Mar. 9, 2011 | 8:41 | 0 | 0 |
| 16 | 0 | 5 | 0d23:35: | 0d02:08: | 1.11205 | 4.58291 | 0.05 | 4.19982 | C | 132 | Mar. 9, 2011 | 10:50 | 0 | 0 |
| 17 | 0 | 6 | 0d23:35: | 0d00:00: | 0 | 0.00001 | 0.26146 | 4.13954 | D | 0 | Mar. 9, 2011 | 10:50 | 0 | 0 |
| 18 | 0 | 6 | 1d03:51: | 0d04:16: | 1.1104 | 4.18135 | 0.26017 | 2.99985 | D | 133 | Mar. 9, 2011 | 15:06 | 0 | 0 |
| 19 | 0 | 3 | 1d03:51: | 0d00:00: | 0.00001 | 0.00002 | 1.00175 | 3.26749 | C | 0 | Mar. 9, 2011 | 15:06 | 0 | 0 |
| 20 | 0 | 3 | 1d06:54: | 0d03:02: | 1.12579 | 4.63085 | 0.00999 | 4.19219 | C | 132 | Mar. 9, 2011 | 18:09 | 0 | 0 |
| 21 | 0 | 4 | 1d06:54: | 0d00:00: | 0 | 0.00001 | 0.262 | 4.14 | D | 0 | Mar. 9, 2011 | 18:09 | 0 | 0 |
| 22 | 0 | 4 | 1d11:13: | 0d04:19: | 1.12323 | 4.23236 | 0.26001 | 3 | D | 133 | Mar. 9, 2011 | 22:28 | 0 | 0 |
| 23 | 0 | 5 | 1d11:13: | 0d00:00: | 0.00001 | 0.00002 | 1.00175 | 3.27054 | C | 0 | Mar. 9, 2011 | 22:28 | 0 | 0 |
| 24 | 0 | 5 | 1d13:21: | 0d02:07: | 1.10881 | 4.56751 | 0.05 | 4.20012 | C | 132 | Mar. 10, 2011 | 0:35 | 0 | 0 |
| 25 | 0 | 6 | 1d13:21: | 0d00:00: | 0 | 0.00001 | 0.26246 | 4.13909 | D | 0 | Mar. 10, 2011 | 0:35 | 0 | 0 |
| 26 | 0 | 6 | 1d17:36: | 0d04:15: | 1.10735 | 4.16785 | 0.26001 | 3 | D | 133 | Mar. 10, 2011 | 4:51 | 0 | 0 |

|  | proposed | standard | delta capacity | delta % |
|---|---|---|---|---|
| Discharge cycle 1 | 1129 | 1112 | 17 | 1.5% |
| Discharge cycle 2 | 1125 | 1110 | 15 | 1.3% |
| Discharge cycle 3 | 1123 | 1107 | 16 | 1.4% |
|  | 1126 | 1110 |  |  |

|  | mAh | % |
|---|---|---|
| Avg increase | 16 | 1.4% |

It can be seen from the above description that by augmenting a charging (re-charging) methodology to continue charging to allow the C2 capacitor to reach equilibrium with the C1 capacitor, in the parlance of the battery model shown in FIG. 1, the battery capacity can be increased an appreciable amount (greater than 1% in the examples given above) without any modification to the rechargeable battery or to the charging hardware, illustrated by FIG. 6, and without exceeding any maximum allowable charge thresholds of the rechargeable battery, such as the maximum allowable charge voltage or charge current cut-off thresholds of the rechargeable battery.

While the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for charging a rechargeable battery, comprising:
    a device supplying a charge current to the rechargeable battery until it is determined that a battery voltage of the rechargeable battery is equal to or greater than a first voltage threshold, wherein the first voltage threshold is an optimal charge threshold of the rechargeable battery;
    the device pausing supplying the charge current;
    determining that a resume charge condition is satisfied, wherein the resume charge condition is one or more of pausing supplying the charge current for a predetermined period of time and a drop in the battery voltage of the rechargeable battery meeting or exceeding a voltage drop threshold;
    the device resuming supplying the charge current to the rechargeable battery until it is determined that the battery voltage of the rechargeable battery is equal to or greater than the first voltage threshold, wherein the first voltage threshold is the optimal charge threshold of the rechargeable battery; and
    the device repeating, during a single charging session, the pausing, determining and resuming, until a stop charge condition is satisfied, wherein the stop charge condition is one or more of performing the repeating a predetermined number of iterations, the battery voltage reaching a steady state voltage that is greater than or equal to an equilibrium voltage threshold of the battery, and a drop in the battery voltage of the rechargeable battery meeting or exceeding a voltage drop threshold.

2. The method of claim 1, wherein the stop charge condition is the battery voltage reaching a steady state voltage that is greater than or equal to an equilibrium voltage threshold of the battery.

3. The method of claim 2, wherein the first voltage threshold is greater than an equilibrium voltage threshold of the battery.

4. The method of claim 2, wherein the steady state voltage is characterized by a voltage drop that is substantially determined based upon the optimal charge threshold of the rechargeable battery and an impedance of the rechargeable battery and is not associated with depletion of the rechargeable battery.

5. The method of claim 1, wherein the resume charge condition is pausing supplying the charge current for a predetermined period of time.

6. The method of claim 1, wherein the resume charge condition is a drop in the battery voltage of the rechargeable battery meeting or exceeding a voltage drop threshold.

7. The method of claim 6, wherein the drop in the battery voltage occurs after a previous charging of the rechargeable battery and is not associated with depletion of the rechargeable battery.

8. The method of claim 1, wherein the resume charge condition is satisfied regardless of depletion of the rechargeable battery.

9. The method of claim 1, further comprising, prior to pausing supplying the charge current, tapering the charge current until the battery voltage is equal to or greater than a second voltage threshold, the second voltage threshold being greater than the first voltage threshold.

10. The method of claim 1, further comprising, during resuming supplying the charge current, tapering the charge current until the battery voltage is equal to or greater than a second voltage threshold, the second voltage threshold being greater than the first voltage threshold.

11. The method of claim 1, further comprising, during resuming supplying the charge current, gradually increasing the charge current from a minimum charge current until the battery voltage is equal to or greater than a second voltage threshold, the second voltage threshold being greater than the first voltage threshold.

12. A non-transitory computer-readable medium having computer-executable instructions for charging a rechargeable battery, comprising:
    supplying a charge current to the rechargeable battery until it is determined that a battery voltage of the rechargeable battery is equal to or greater than a first voltage threshold, wherein the first voltage threshold is an optimal charge threshold of the rechargeable battery;
    pausing supplying the charge current;
    determining that a resume charge condition is satisfied, wherein the resume charge condition is one or more of pausing supplying the charge current for a predetermined period of time and a drop in the battery voltage of the rechargeable battery meeting or exceeding a voltage drop threshold;
    resuming supplying the charge current to the rechargeable battery until it is determined that the battery voltage of the rechargeable battery is equal to or greater than the first voltage threshold, wherein the first voltage threshold is the optimal charge threshold of the rechargeable battery; and repeating, during a single charging session, the pausing, determining and resuming, until a stop charge condition is satisfied, wherein the stop charge condition is one or more of performing the repeating a predetermined number of iterations, the battery voltage reaching a steady state voltage that is greater than or equal to an equilibrium voltage threshold of the battery, and a drop in the battery voltage of the rechargeable battery meeting or exceeding a voltage drop threshold.

13. The non-transitory computer-readable medium of claim 12, further comprising, prior to pausing supplying the charge current, tapering the charge current until the battery voltage is equal to or greater than a second voltage threshold, the second voltage threshold being greater than the first voltage threshold.

14. The non-transitory computer-readable medium of claim 12, further comprising, during resuming supplying the charge current, tapering the charge current until the battery voltage is equal to or greater than a second voltage threshold, the second voltage threshold being greater than the first voltage threshold.

15. The non-transitory computer-readable medium of claim 12, further comprising, during resuming supplying the charge current, gradually increasing the charge current from a minimum charge current until the battery voltage is equal to or greater than a second voltage threshold, the second voltage threshold being greater than the first voltage threshold.

16. A device for charging a rechargeable battery, comprising:
    a voltage detector that detects a voltage across terminals of the rechargeable battery;
    a switching device that controls application or interruption of a charge current to the rechargeable battery;
    a charging controller coupled to the switching device and to the voltage detector that controls the switching device such that:
    the charging controller controls the switching device to supply a charge current to the rechargeable battery until it is determined that a battery voltage of the rechargeable battery is equal to or greater than a first voltage threshold, wherein the first voltage threshold is an optimal charge threshold of the rechargeable battery;
    the charging controller controls the switching device to pause supplying the charge current;
    in response to determining that a resume charge condition is satisfied, the charging controller controls the switching device to resume supplying the charge current to the rechargeable battery until it is determined that the battery voltage of the rechargeable battery is equal to or greater than the first voltage threshold, wherein the first voltage threshold is the optimal charge threshold of the rechargeable battery and wherein the resume charge condition is one or more of pausing supplying the charge current for a predetermined period of time and a drop in the battery voltage of the rechargeable battery meeting or exceeding a voltage drop threshold; and
    repeating, during a single charging session, the pausing, determining and resuming, until a stop charge condition is satisfied, wherein the stop charge condition is one or more of performing the repeating a predetermined number of iterations, the battery voltage reaching a steady state voltage that is greater than or equal to an equilibrium voltage threshold of the battery, and a drop in the battery voltage of the rechargeable battery meeting or exceeding a voltage drop threshold.

17. The device of claim 16, the device further comprising a timer coupled to the charging controller and upon the timer reaching a predetermined time, the resume charge condition is satisfied and the charging controller controls the switching device to resume supplying the charge current to the rechargeable battery.

18. The device of claim 16, wherein the voltage detector measures the battery voltage of the rechargeable battery to determine there is a drop in the battery voltage that is not associated with depletion of the rechargeable battery and is equal to or greater than a voltage drop threshold the resume charge condition is satisfied, the charging controller controls the switching device to resume supplying the charge current to the rechargeable battery.

19. The device of claim 16, wherein the resume charge condition is satisfied following a previous charging of the rechargeable battery by the device during the single charging session.

20. The device of claim 16, wherein the stop charge condition is the battery voltage reaching a steady state voltage that is greater than or equal to a second voltage threshold that is an equilibrium voltage threshold.

21. The device of claim 20, wherein the first voltage threshold is greater than the second voltage threshold.

22. The device of claim 20, wherein the steady state voltage is characterized by a voltage drop that is substantially determined based upon the optimal charge threshold of the rechargeable battery and the impedance of the rechargeable battery and is not associated with depletion of the rechargeable battery.

* * * * *